(12) United States Patent
Serbetli et al.

(10) Patent No.: US 9,077,494 B2
(45) Date of Patent: Jul. 7, 2015

(54) SIGNAL PROCESSOR, RECEIVER AND SIGNAL PROCESSING METHOD

(75) Inventors: Semih Serbetli, Eindhoven (NL); Andries Pieter Hekstra, Eindhoven (NL)

(73) Assignee: NXP, B.V., Eindhoven (NL)

( * ) Notice: Subject to any disclaimer, the term of this patent is extended or adjusted under 35 U.S.C. 154(b) by 217 days.

(21) Appl. No.: 13/257,876

(22) PCT Filed: Mar. 19, 2010

(86) PCT No.: PCT/IB2010/051205
§ 371 (c)(1),
(2), (4) Date: Sep. 20, 2011

(87) PCT Pub. No.: WO2010/106527
PCT Pub. Date: Sep. 23, 2010

(65) Prior Publication Data
US 2012/0008722 A1    Jan. 12, 2012

(30) Foreign Application Priority Data
Mar. 20, 2009    (EP) .................................... 09155757

(51) Int. Cl.
*H04L 27/06*    (2006.01)
*H04L 5/00*    (2006.01)
(Continued)

(52) U.S. Cl.
CPC ............ *H04L 5/0044* (2013.01); *H04L 5/0023* (2013.01); *H04L 25/0204* (2013.01); *H04L 27/265* (2013.01)

(58) Field of Classification Search
CPC .......... H04B 7/02; H04B 7/04; H04B 7/0404; H04B 7/0413; H04B 7/08; H04B 7/084; H04B 7/0842; H04B 7/0848; H04B 7/0851; H04B 7/086; H04B 7/0862; H04B 7/0865
USPC ......... 375/259, 260, 267, 285, 316, 340, 345, 375/346, 347, 349
See application file for complete search history.

(56) References Cited

U.S. PATENT DOCUMENTS 6,834,043 B1    12/2004    Vook et al.
7,430,257 B1 *  9/2008    Shattil .......................... 375/347
(Continued)

FOREIGN PATENT DOCUMENTS

CN    101375567 A    2/2009
EP    2 051 425 A1    4/2009

OTHER PUBLICATIONS

A. A. Hutter, J. S. Hammerschmidt, E. de Carvalho, J.M. Cioffi, "Receive Diversity for Mobile OFDM Systems" IEEE 2000.*
(Continued)

*Primary Examiner* — Siu Lee

(57) ABSTRACT

A processor (110) is disclosed for processing a plurality of Fourier-transformed instances of a symbol, each instance being comprised in one of a plurality of frequency-divided multiplexed subcarriers, said processor being arranged to estimate, for each instance, the channel gain and the inter-carrier interference contribution to said symbol from neighboring subcarriers due to a time-varying channel response of the received signal, and combine the instances into a single representation of said symbol based on the estimated channel gain and the inter-carrier interference contributions. A receiver comprising such a processor and a method for processing such signals are also disclosed.

18 Claims, 6 Drawing Sheets

(51) Int. Cl.
*H04L 25/02* (2006.01)
*H04L 27/26* (2006.01)

(56) References Cited

U.S. PATENT DOCUMENTS

| | | | | |
|---|---|---|---|---|
| 7,912,142 | B2* | 3/2011 | Ma et al. | 375/285 |
| 7,995,688 | B2* | 8/2011 | Hong et al. | 375/346 |
| 8,345,809 | B2* | 1/2013 | Husen et al. | 375/350 |
| 8,428,158 | B2 | 4/2013 | Maltsev et al. | |
| 2002/0181549 | A1* | 12/2002 | Linnartz et al. | 375/142 |
| 2004/0114506 | A1 | 6/2004 | Chang et al. | |
| 2004/0198229 | A1* | 10/2004 | Hirata | 455/63.4 |
| 2005/0147025 | A1* | 7/2005 | Auer | 370/203 |
| 2006/0115011 | A1* | 6/2006 | Tsuruta et al. | 375/260 |
| 2006/0153283 | A1* | 7/2006 | Scharf et al. | 375/148 |
| 2007/0297522 | A1* | 12/2007 | Baggen et al. | 375/260 |
| 2009/0067514 | A1* | 3/2009 | Stojanovic | 375/260 |
| 2009/0129493 | A1* | 5/2009 | Zhang et al. | 375/260 |
| 2010/0158094 | A1* | 6/2010 | Kang et al. | 375/232 |
| 2010/0195754 | A1* | 8/2010 | Li et al. | 375/267 |

OTHER PUBLICATIONS

Jean-Paul M.G. Linnartz and Alexei Gorokhov, "New Equalization Approach for OFDM over Dispersive and Rapidly Time Varying Channel", IEEE 2000.*

Won Gi Jeon, Student Member, Kyung Hi Chang, and Yong Soo Cho, "An Equalization Technique for Orthogonal Frequency-Division Multiplexing Systems in Time-Variant Multipath Channels", IEEE Transactions on Communications, vol. 47, No. 1, Jan. 1999.*

A. A. Hutter I, J. S. Hammerschmidt I, E. de Carvalho, "Effects of Fading Correlation on Multiple Antenna Reception Mobile OFDM Systems", IEEE 2000.*

Monisha Ghosh, Pen Li, Xuemei Ouyang, "Reduced-Complexity ML Detection for Coded MIMO Systems Using an Absolute-Value Search", IEEE 2005.*

Semih Serbetli, "Doppler Compensation for Mobile OFDM Systems with Multiple Receive Antennas", IEEE 2012.*

Russell, M. et al. "Interchannel Interference Analysis of OFDM in a Mobile Environment", 1995 IEEE 45$^{th}$ Vehicular Techn. Conf., pp. 820-824 (1995).

Verdu, S. "Multiuser Detection", Cambridge University Press, cover and copyright pgs., pp. 291-298 (1998).

Rinne, J. "Subcarrier-Based Selection Diversity Reception of DVB-T in a Mobile Environment", IEEE 5oth Vehicular Techn. Conf., pp. 1043-1047 (1999).

Robertson, P. et al. "The Effects of Doppler Spreads in OFDM(A) Mobile Radio Systems", IEEE 50$^{th}$ Vehicular Techn. Conf., pp. 329-333 (1999).

Rinne, J. "Some Elementary Suboptimal Diversity Reception Schemes for DVB-T in Mobile Conditions", IEEE Trans. on Consumer Electronics, vol. 46, No. 3, pp. 847-850 (2000).

Hutter, A.A. et al. "Receive Diversity for Mobile OFDM Systems", Wireless Communications and Networking Conference 2000, IEEE, pp. 707-712 (2000).

Rinne, J. "Diversity Reception Schemes for COFDM in a Mobile Environment Utilizing Soft-Bit Information", IEEE Int'l. Conf. on Communications, vol. 10, pp. 3041-3045 (2001).

Sampath, H. et al. "Generalized Linear Precoder and Decoder Design for MIMO Channels Using the Weighted MMSE Criterion", IEEE Trans. on Communications, vol. 49, No. 12, pp. 2198-2206 (2001).

Li, Y. et al. "Bounds on the Interchannel Interference of OFDM in Time-Varying Impairments", IEEE Trans. on Communications, vol. 49, No. 3, pp. 401-404 (2001).

Munster, M. et al. "Second-Order Channel Parameter Estimation Assisted Cancellation of Channel Variation-Induced Inter-Subcarrier Interference in OFDM Systems", Proc. of the Int'l. Conf. on Trends in Communications (Eurocon'2001), vol. 1, pp. 1-5 (2001).

Tomasin, S. et al., "Reduced Complexity Doppler Compensation for Mobile DVB-T", 13$^{th}$ IEEE Int'l. Symp. on Personal, Indoor and Mobile Radio Communications, vol. 5, pp. 2077-2081 (2002).

Kim, S.W. et al. "Optimum Receive Antenna Selection Minimizing Error Probability" 2003 IEEE Wireless Communications and Networking, pp. 441-447 (2003).

Husen, S. A. et al., "Simple Doppler Compensation for DVB-T," 25$^{th}$ Symposium on Information Theory in Benelux, retrieved from the internet at http://www.win.tue.nl/wic2004/30.pdf., 8 pgs. (2004).

Gorokhov, A. et al., "Robust OFDM Receivers for Dispersive Time-Varying Channels: Equalization and Channel Acquisition", IEEE Trans. on Communications, vol. 52, No. 4, pp. 572-583 (2004).

Molisch, A.F. et al. "MIMO Systems With Antenna Selection", IEEE Microwave Magazine, vol. 5, No. 1, pp. 46-56 (Mar. 2004).

Tomasin, S., et al. "Iterative Interference Cancellation and Channel Estimation for Mobile OFDM", IEEE Trans. on Wireless Communications, vol. 4, No. 1, pgs. 238-245 (Jan. 2005).

Ghosh, M., et al., "Reduced-Complexity ML Detection for Coded MIMO Systems Using an Absolute-Value Search", IEEE Int'l. Conf. on Acoustics, Speech, and Signal Processing vol. 3, pp. 1025-1028 (Mar. 2005).

Klenner, P. et al. "Doppler-Compensation for OFDM Transmission by Sectorized Antenna Reception", University of Bremen, Department of Communications Engineering, 6$^{th}$ International Workshop on Multi-Carrier Spectrum (MCSS07), 10 pgs. (May 2007).

International Search Report & Written Opinion for Int'l Patent Application No. PCT/IB2010/051205 (Jun. 21, 2010).

Hammerschmidt, Joachim, et al; "Comparison of Single Antenna, Selection Combining, and Optimum Combining Reception at the Vehicle"; IEEE; 6 pages (1999).

Hutter, A.A., et al; "On the Impact of Channel Estimation for Multiple Antenna Diversity Reception in Mobile OFDM Systems"; IEEE, 5 pages (2000).

Hutter, A. A.; "Determination of Intercarrier Interface Covariance Matrices and their Application to Advanced Equalization for Mobile OFDM"; 5th International Workshop; Hamburg; 5 pages (2000).

Klenner, Peter et al.; "Spatially Interpolated OFDM with Channel Estimation for Fast Fading Channels"; IEEE; 5 pages (2007).

Norklit, Ole, et al.; "Angular Partitioning to Yield Equal Doppler Contributions"; IEEE Transactions on Vehicular Technology, vol. 48, No. 5; 6 pages (Sep. 1999).

Li, Ye (Geoffrey), et al; "Adaptive Antenna Arrays for OFDM Systems with Cochannel Interference"; IEEE Transactions on Communications, vol. 47, No. 2; 13 pages (Feb. 1999).

Yu, Young Cheol, et al; "Study for Various Array Antenna assisted Doppler Spread Compensator with MRC Diversity of ISDB-T Receiver"; IEEE 5 pages; (2006).

Office Action from Counterpart application CN 201080012789 (Sep. 30, 2013).

* cited by examiner

SIGNAL PROCESSOR, RECEIVER AND SIGNAL PROCESSING METHOD

FIELD OF THE INVENTION

The present invention relates to a processor for processing a plurality of Fourier-transformed instances of a symbol, each instance being comprised in one of a plurality of frequency-divided multiplexed subcarriers, The present invention further relates to a receiver comprising such a processor.

The present invention yet further relates to a method of processing a plurality of Fourier-transformed antenna signals, each signal comprising a plurality of frequency-divided multiplexed subcarriers, each subcarrier comprising a symbol, wherein at least two subcarriers comprise different instances of the same symbol.

BACKGROUND OF THE INVENTION

Orthogonal Frequency Division Multiplexing (OFDM) is an attractive transmission scheme for wireless systems to achieve high data rates. It has been widely adopted in different wireless standards, e.g., DVB-T/H, ISDB-T, IEEE 802.11a/g/n. With an appropriate guard interval, OFDM provides a spectrally efficient transmission scheme that is robust to the multipath spread of the wireless channel by a simple equalization.

Although the robustness against multipath effects and high spectral efficiency are advantages of OFDM systems, the OFDM systems are sensitive to mobility, i.e. the transmission of an OFDM signal from a non-stationary transmitter and/or the reception of the OFDM signal by a non-stationary receiver. Since mobility results in Doppler spreading, it leads to the loss of orthogonality among the subcarriers known as inter-carrier interference (ICI). If not compensated, ICI hampers the reception at the mobile terminals for instance because ICI increases the bit error rate (BER) in a processed signal.

Antenna selection is one of the simplest and most effective ways of obtaining diversity in receivers comprising multiple spatially separated antennas for receiving the OFDM signal through different channels. Since each channel consists of a different set of multiple paths, a channel can be selected in which the signal-to-noise ratio (SNR) is maximized within the set of antennas.

Receive antenna selection mechanisms are especially popular due to their ease of implementation without the need to change the communication standard. Several antenna selection mechanisms have been investigated for conventional multiple receive antenna systems, MIMO systems. In "Some Elementary Suboptimal Diversity Reception Schemes For DVB-T in Mobile Conditions" by Jukka Rinne in IEEE Transactions on Consumer Electronics, 46(3), 2000, pages 847-850, an SNR-based receive antenna selection mechanism for mobile OFDM systems is discussed.

In time-invariant channels, receive antenna selection provides spatial diversity and mitigates the effects of fading. However, in time-varying channels, conventional SNR based antenna selection has limited capability since the interference, i.e. the Doppler spreading, which determines the performance of mobile OFDM systems is not considered in these conventional antenna selection processes.

SUMMARY OF THE INVENTION

The present invention seeks to provide a processor for processing a signal comprising a plurality of frequency-divided multiplexed subcarriers such as an OFDM signal, in which the Doppler spreading-induced ICI of the received signal is effectively mitigated.

The present invention further seeks to provide a receiver comprising such a processor.

The present invention yet further seeks to provide a method for processing a signal comprising a plurality of frequency-divided multiplexed subcarriers such as an OFDM signal, wherein the Doppler contribution to the received signal is effectively mitigated.

According to a first aspect of the present invention, there is provided a processor for processing a plurality of Fourier-transformed antenna signals, a plurality of Fourier-transformed instances of a symbol, each instance being comprised in one of a plurality of frequency-divided multiplexed subcarriers, said processor being arranged to estimate, for each instance, the channel gain and the inter-carrier interference contribution to said symbol from neighboring subcarriers due to time-varying channel response; and combine the instances into a single representation of said symbol based on the estimated channel gain and inter-carrier interference contributions.

The present invention is based on the realization that several instances of the same symbol, such as received or transmitted by different antennas or by different subcarriers carrying the same symbol, wherein the different subcarriers may be part of the same or different signals, can be combined using combining metrics to reduce the ICI contribution to the combined signal. Since different instances of the same symbol will be received on different subcarriers or on different channels in time or frequency or have traveled through different multipath channels due to the use of multiple transmit or receive antennas, the channel gain and ICI contribution to the different instances of the subcarriers carrying the symbol will also differ. Hence, the estimation of the channel gain and ICI contribution to each symbol instance can be used to effectively reduce this contribution by combining of the different symbol instances.

In an embodiment, the received instance of a subcarrier symbol is expressed as a truncated Taylor expansion at least including the time-independent zero$^{th}$ order term of the expansion, which is estimated at the receiver for each symbol, and the first order term including the ICI contributions to the received instance of the subcarrier, the ICI contributions can be minimized by appropriate weighted combinations of the various instances of the subcarrier.

In an embodiment, the combination of the subcarrier signals is based on the estimated inter-channel interference contributions at the subcarrier from its nearest neighbor subcarriers only. This has been based on the knowledge that the majority of the ICI contributions to a subcarrier are caused by interference from its nearest neighbor subcarriers. The nearest two neighbors account for over 60% of the total ICI, whereas the nearest four neighbors account of over 75% of the total ICI. Hence, by only considering some of the other instances of the subcarrier for the determination of the ICI contribution to a subcarrier instance, the complexity of the processor is reduced at the cost of a negligible increase in bit errors in the processed signal.

In a preferred embodiment, the processor further comprises a data storage portion comprising a set of predefined vectors having a number of fields corresponding to the number of different instances of the same symbol, each field containing a weight factor, wherein the processor is arranged to generate a plurality of channel response products by multiplying the channel responses of the subcarriers in the different instances relating to the same symbol with the corresponding weight factor from a predefined vector selected from said set and to combine the channel response products, said predefined vector being selected such that the inter-carrier interference contribution to the combined channel response products is reduced. This has the advantage that an accurate cancellation of the ICI contributions to a subcarrier can be achieved with a processor of limited complexity.

Advantageously, the processor is arranged to select the predefined vector from said set for which the combined channel response products have the maximum signal-to-interference-and-noise ratio (SINR). The SINR optimization metric has been demonstrated to yield a low-cost implementation of the combining algorithm of different instances of the same symbol on the processor of the present invention.

Alternatively, the processor is arranged to select the predefined vector from said set for which the combined channel response products lead to a sufficiently improved minimum Euclidian or absolute distance in the combined signal.

It is not necessary for the processor of the present invention to use preset vectors to combine the different instances of the same symbol. In a further embodiment, the processor is arranged to combine the subcarriers relating to the same symbol in the respective instances of the same symbol using a minimum mean-squared error (MMSE) metric to obtain a maximum signal-to-interference-and-noise ratio for said symbol.

Alternatively, the processor is arranged to combine the subcarriers relating to the same symbol in the respective different instances of the same symbol using an approximation of the MMSE metric, to obtain a sufficiently improved signal-to-interference-and-noise ratio for said symbol.

Both the MMSE and approximation of MMSE metrics also achieve an effective cancellation of the ICI contribution to the subcarrier of interest.

The processor of the present invention may be advantageously integrated in a receiver further comprising a fast Fourier transformation stage for transforming a plurality of frequency-divided multiplexed subcarriers, each subcarrier comprising a symbol, wherein at least two subcarriers comprise different instances of the same symbol; a processor of the present invention coupled to the fast Fourier transformation stage; and a post-processing stage coupled to the processor for decoding the combined subcarrier signals.

Such a receiver is more robust against Doppler spreading of a transmitted frequency divided multiplexed signal such as OFDM signal than prior art receivers. It will be appreciated that the fast Fourier transform stage, the processor and the post-processing stage do not have to be discrete components. At least one of the fast Fourier transform stage and the post-processing stage may be located on the same dye as the processor, e.g. in the form of a system-on-chip or the like.

In an embodiment, the receiver further comprises a plurality of antennas coupled to the fast Fourier transformation stage, each antenna being arranged to receive an instance of the plurality of frequency-divided multiplexed subcarriers, wherein the different instances of the same symbol are obtained from different instances of the plurality of frequency-divided multiplexed subcarriers as received by different antennas.

The receiver may further comprise an antenna selection stage for selecting one of said antennas, wherein the post-processing stage comprises a soft bit computation stage arranged to calculate the soft bits for a subcarrier received by the selected antenna.

According to a further aspect of the present invention, there is provided a method of processing a plurality of Fourier-transformed antenna signals, each signal comprising a plurality of frequency-divided multiplexed subcarriers, each subcarrier comprising a symbol, wherein at least two subcarriers comprise different instances of the same symbol, said method comprising estimating, for each instance, the inter-carrier interference contribution to said symbol received in a subcarrier from its neighboring subcarriers due to time-varying channel response; and combining the subcarriers relating to the same symbol in the respective antenna signals based on the estimated inter-channel interference contributions.

This has the advantage of producing a combined symbol representation signal in which the inter-carrier interference contributions to the various subcarriers combined into this signal have been reduced, such that upon decoding this signal, an improved bit error rate is obtained.

Preferably, the method further comprises providing a set of predefined vectors having a number of fields corresponding to the number of antenna signals, each field containing a weight factor; generating a plurality of channel response products by multiplying the channel responses of the subcarriers relating to the same symbol with the corresponding weight factor from a predefined vector selected from said set; and combining the channel response products, said predefined vector being selected such that the inter-channel interference contribution to the combined channel response products is reduced.

This embodiment of the method of the present invention can be implemented on a processor without requiring calculation steps that can only be realized with a large number of gates.

BRIEF DESCRIPTION OF THE EMBODIMENTS

Embodiments of the invention are described in more detail and by way of non-limiting examples with reference to the accompanying drawings, wherein.

Figure 7:
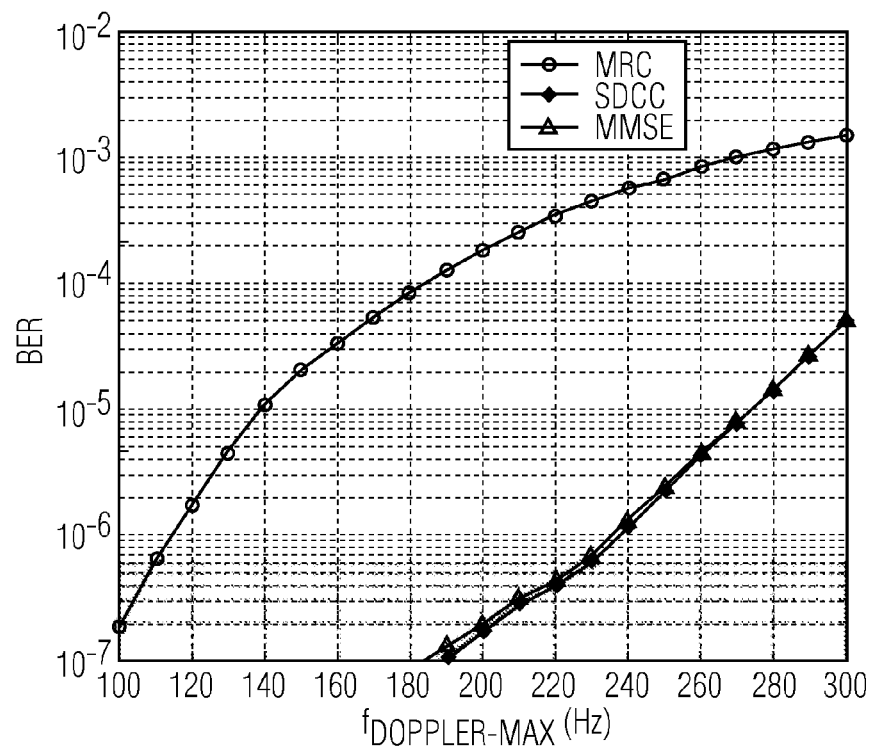
Figure 8:
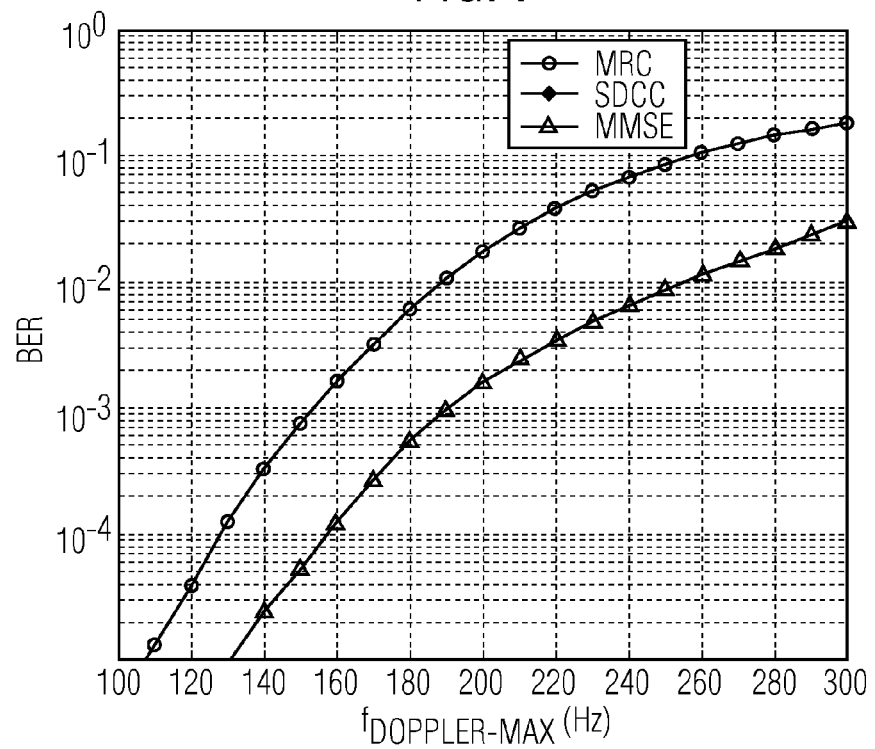
Figure 9:
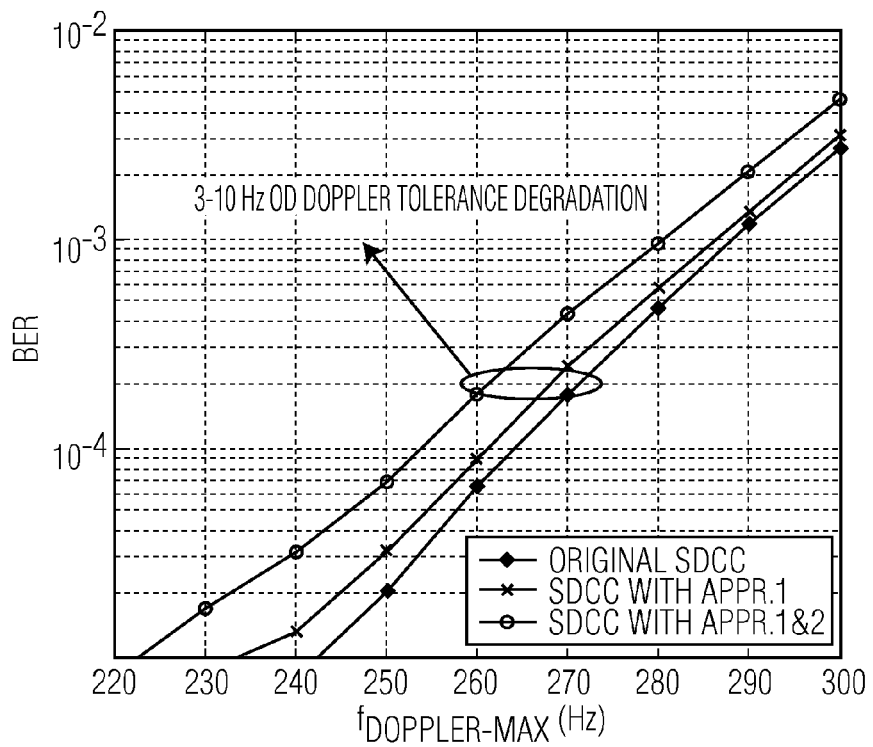
Figure 10:
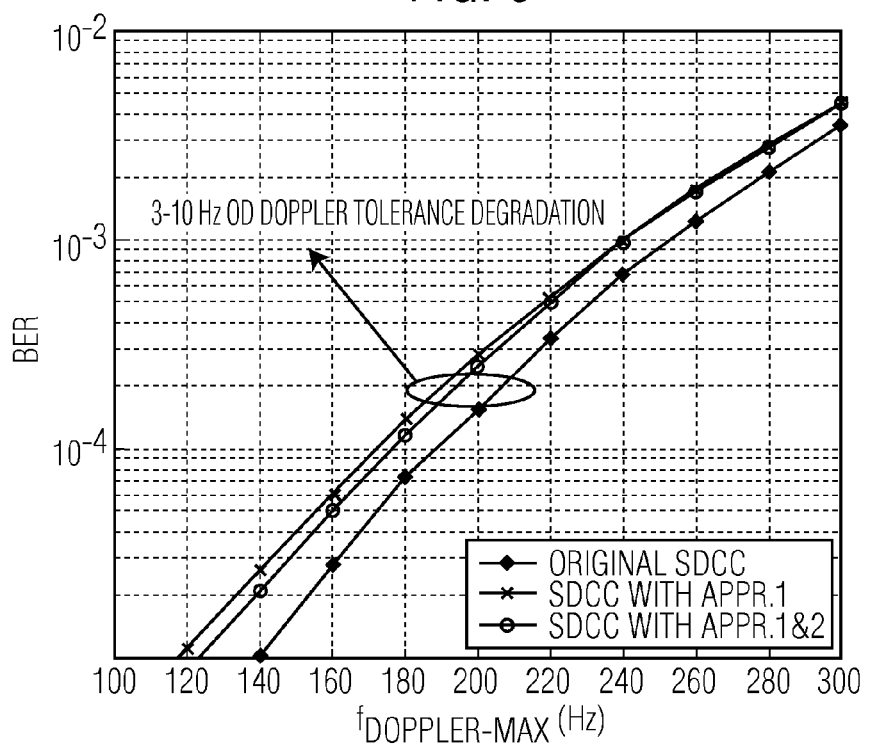

FIGS. 7 and 8 depict the BER versus maximum Doppler frequency performance for a receiver according to yet another embodiment of the present invention in a near scatter environment and a far scatter environment respectively; and FIGS. 9 and 10 depict the BER versus maximum Doppler frequency performance for a receiver according to a further embodiment of the present invention in a near scatter environment and a far scatter environment respectively.

DETAILED DESCRIPTION OF THE DRAWINGS

It should be understood that the Figures are merely schematic and are not drawn to scale. It should also be understood that the same reference numerals are used throughout the Figures to indicate the same or similar parts.

In the detailed description of this application, the concept of the present invention will be explained in more detail based on the concept of multiple instances of the same symbol being received by different antennas. However, this is for the sake of brevity only and the present invention may be applied to different scenarios, including scenarios in which symbol redundancy has been intentionally added, such as a scenario in which different subcarriers within the same signal contain the same symbol or a scenario in which different signals contain the same symbol, e.g. in respective subcarriers of these signals.

Figure 1:
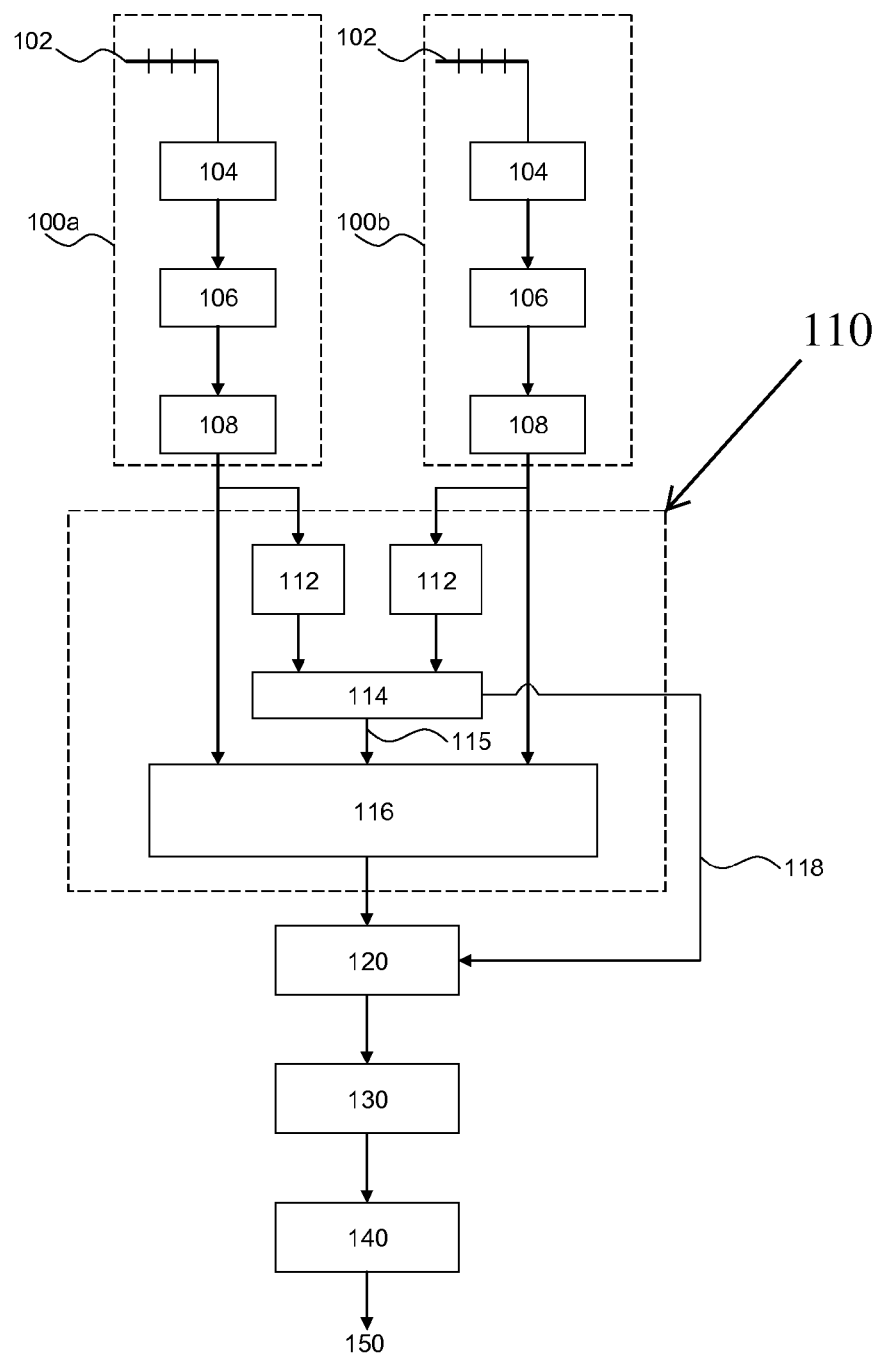
FIG. 1 depicts an example embodiment of the receiver of the present invention.

FIG. 1 schematically depicts a receiver according to an embodiment of the present invention. The receiver comprises a plurality of antenna stages 100. Two antenna stages 100a and 100b are shown by way of non-limiting example only. The skilled person will understand that any number of antenna stages may be included in such a receiver design. Each antenna stage 100 comprises a receive antenna 102 for receiving a frequency-divided multiple subcarrier comprising signal such as a signal generated according to the OFDM scheme. Each antenna 102 is coupled to a RX filter and an analogue/digital conversion stage, which for the sake of simplicity are represented by a single block 104 in each antenna stage 100, although it should be understood that these functionalities may instead be implemented by discrete components. The digitized received signal is subsequently forwarded to a guard interval removal stage 106 and a fast-Fourier transformation stage 108 for transforming the received signal from the time domain to the frequency domain.

The various stages of the antenna stages 100 may be realized using any suitable functional component known to the skilled person. This may include implementation by means of discrete hardware components or by means of a signal processor implementing several of these functions in software. Also, although each antenna stage 100 is shown to have discrete components, e.g. discrete fast-Fourier transformation stages 108, it is emphasized that alternative implementations in which a single stage such as the fast-Fourier transformation stage 108 has multiple inputs to handle the incoming signals from all antenna stages 100 is equally feasible. Other variations will be apparent to the skilled person.

The receiver further comprises a processor 110 for implementing an embodiment of the method of the present invention. The processor 110 comprises a plurality of channel estimation stages 112, one for each antenna stage 100. The channel estimation stages 112 are arranged to compute channel gains and channel derivatives for each subcarrier and to provide a channel estimation signal to the preset combining weight/antenna selection stage 114, which is further arranged to select the best one of the preset combining weights or antennas for each subcarrier, as will be explained in more detail later in the description of the various embodiments of the method of the present invention. The preset combining weight/antenna selection stage 114 arranged to provide a channel computation result including selected antenna information or a channel combination weight information to the subcarrier combination stage 116, which is further arranged to receive the received antenna signals directly from the antenna stages 100 such that the subcarrier combination stage 116 can combine the subcarrier of interest based on the analysis of the antenna signals performed by the preset combining weight/antenna selection stage 114. The preset combining weight/antenna selection stage 114 is further arranged to provide the post-processing stage with channel gains and channel derivative gains for the combined signal using the selected antenna or preset combining weights through path 118.

The combined subcarrier signal is forwarded to the post-processing stage formed by the soft bit computation stage 120, the further block 130 in which interleaving and/or scrambling operations may be performed, and the decoder 140 such as a Viterbi decoder for decoding the encoded signal generated by the transmitter of the signal received by the receiver of the present invention. The decoder 140 produces the data 150 to be forwarded to a further data processor (not shown). Hence, the post-processing stage implements a decoding stage for the combined signal from the subcarrier combination stage 116.

In FIG. 1, the decoding stage implements a soft output Viterbi algorithm by way of non-limiting example. In this algorithm, the soft bit computation stage 120 is arranged to receive survivor path information, i.e. the information concerning the selected antenna, from the preset combining weight/antenna selection stage 114 through signal path 118. By using the combined signal from preset combining weight/antenna selection stage 114 and computing the signal-to-interference level in the combined signal by using channel gain of the combined signal and the channel derivatives in the combined signal obtained through signal path 118, the soft bit computation stage 120 estimates the transmitted bits in the combined signal, and may also compute the reliability of these estimations which may be further used in the post processing stages such as Viterbi decoder. Soft bit computation stage 120 may also further comprise an ICI subtraction step first in which the ICI signal is estimated in the combined signal and subtracted from the combined signal and then the transmitted bits in the combined signal are estimated together with the reliability of these estimations. It is however emphasized that alternative decoding algorithms may be used, for which the soft bit computation stage 120 and the signal path 118 may be omitted. The exact implementation of the post-processing or decoding stage is not essential to the present invention and any suitable implementation may be contemplated.

In addition, it should be understood that although the inventive concept of the present invention mainly resides in the processor 110, it should be understood that this does not exclude the processor from further comprising at least some parts of the antenna stages 100 and/or the post-processing stage.

The inventive concept of the present invention can be summarized by the combination of multiple instances of the same subcarrier as received by the various antennas 102, in which the weight assigned to each subcarrier in the combined signal is determined on an estimation of the magnitude of the ICI in that subcarrier instance. The determination of the weight assignment may be done in several ways, as will be explained in more detail in the following theoretical description of the method of the present invention.

This description of the method of the present invention is, by way of non-limiting example, based on a conventional OFDM system with M receive antennas where N complex symbols, $s=[s_1; s_2 \ldots ; s_N]$, are modulated onto N orthogonal subcarriers by using an N-point IFFT. It is assumed that a cyclic prefix longer than the length of the channel impulse response is added to the signal to prevent inter-block-interference, such that only ICI needs to be considered. The transmitted OFDM signal is assumed to travel through a wide sense stationary time varying multipath channel consisting of uncorrelated paths with complex attenuation $\{h_{i,l}(t)\}$ and a delay of $\{\tau_l\}$ with an impulse response:

$$h_i(t, \tau) = \sum_{l=0}^{L-1} h_{i,l}(t)\delta(\tau - \tau_l), \tag{1}$$

for the $i^{th}$ receive antenna where L is the number of multipath components. Following the notation previously disclosed in e.g. A. Gorokhov et al. in IEEE Transactions on Communications, Vol. 52, No. 4, 2004, pages 572-583 Following the same notation, the baseband received signal at the $i^{th}$ receive antenna in time domain is denoted $r_i(t)$ and express it as:

$$r_i(t) = \sum_{m=0}^{N-1} H_{i,m}(t)e^{j2\pi m f_s t} s_m + v_i(t), \quad (2)$$

where:

$$H_{i,m}(t) = \sum_l h_{i,l}(t)e^{-j2\pi m f_s \tau_l}$$

Is the response of subcarrier m at time t at the $i^{th}$ antenna, $f_s$ is the subcarrier frequency spacing and $v_i(t)$ is the additive white Gaussian noise (AWGN) with variance $\sigma_n^2$ at the $i^{th}$ antenna. Following the approach discussed in Gorokhov et al., $H_{i,m}(t)$ can be approximated by using Taylor series expansion around $t_0$ up to the first-order term as:

$$H_{i,m}(t) \approx H_{i,m}(t_0) + H'_{i,m}(t_0)(t-t_0) \quad (3)$$

where $t_0$ can be chosen as the middle of the windowed OFDM symbol. Using (3), after sampling the received signal, appropriate windowing and FFT operation, the baseband received signal at the $m^{th}$ subcarrier of the $i^{th}$ antenna, $y_{i,m}$, can be approximated as:

$$y_{i,m} \approx H_{i,m}(t_0)s_m + \sum_{n=0}^{N-1} H'_{i,n}(t_0)\Xi_{m,n}s_n + \vartheta_m, \quad (4)$$

where $$\Xi_{m,n} = \frac{1}{N^2 f_s}\sum_{k=0}^{N-1}(k-N/2)e^{j2\pi(n-m)k/N}, \quad (5)$$

with $t_0$ chosen as the middle of the windowed OFDM symbol. The term in the summation of (4) represents the ICI term that the $m^{th}$ subcarrier experiences. The term $\theta_m$ in equation 4 is the $m^{th}$ noise sample after the fast Fourier transformation. Equation (4) forms the basis of the ICI aware subcarrier based antenna selection/preset combining weight selection for Doppler spread compensation of the embodiments of the method of the present invention. Equation 4 is typically provided at the output of the fast-Fourier transformation stages 108.

In a preferred embodiment, the channel gain and channel derivative of subcarrier m during each OFDM symbol, i.e., $\{H_{i,m}(t0)\}$ and $\{H'_{i,m}(t0)\}$, are estimated for each antenna in respective channel estimation blocks 112. Because some of the $s_m$ in (4) are pilot symbols that are known a priori at the receiver because their values are defined in the appropriate communication standard, the received signals for these pilot subcarriers can be used to estimate the channel gains H. For the other subcarriers where the data is transmitted, the channel gains can be estimated by interpolating in time and frequency over the channel gains obtained for the pilot subcarriers. One way of obtaining the channel derivatives for each subcarrier is as follows:

$$H'_{i,m}(t_0) = \frac{H_{i,m}(t_0+T_{OFDM}) - H_{i,m}(t_0-T_{OFDM})}{2T_{OFDM}} \quad (6)$$

where $H_{i,m}(t_0+T_{OFDM})$ and $H_{i,m}(t_0-T_{OFDM})$ represent the channel frequency response of subcarrier m of $i^{th}$ antenna for the next and previous OFDM symbols, respectively, and $T_{OFDM}$ is the OFDM symbol duration, i.e., $1=f_s+TCP$ with TCP being the duration of the guard interval.

The time-invariant and time-variant parts of each OFDM symbol, i.e. the terms $\{H_{i,m}(t0)\}$ and $\{H'_{i,m}(t0)\}$ as estimated by the channel estimation blocks 112, are used to combine the different instances of the same symbol as received through the different channels via respective antennas 102. To this end, the preset combining weight/antenna selection stage 114 implements a metric for determining how the various instances of the OFDM symbol should be combined such that the BER in the data signal 150 is minimized. In other words, this metric targets to minimize the Doppler spread in the combined signal by deciding which weights should be assigned to the different instances of the symbol to obtain the combined signal.

The present invention incorporates several embodiments of such a decision metric. These embodiments have in common that they are based on the approximation that the reception of the OFDM symbol centered around time $t_0$, thus, the $t_0$ terms in the channel and channel derivatives are dropped for the sake of simplicity. Without losing generality, it is assumed that the modulated symbols have unit norm power, i.e., $E[|s_n|^2]=1$. Stacking all the received signals from each receive antenna for $m^{th}$ subcarrier, the received signal can be represented in a vector form as: $y_m = [y_{1,m}; y_{2,m}; \ldots; y_{M,m}]^T$, which may be approximated by the estimated time variant and time invariant channel contributions:

$$\approx \begin{bmatrix} H_{1,m} \\ H_{2,m} \\ \vdots \\ H_{M,m} \end{bmatrix} s_m + \sum_{n=0}^{N-1} \begin{bmatrix} H'_{1,n} \\ H'_{2,n} \\ \vdots \\ H'_{M,n} \end{bmatrix} \Xi_{m,n}s_n + \begin{bmatrix} \vartheta_{1,m} \\ \vartheta_{2,m} \\ \vdots \\ \vartheta_{M,m} \end{bmatrix} \quad (7)$$

$$\approx c_m s_m + \sum_{n=0}^{N-1} d_n \Xi_{m,n} s_n + \bar{\vartheta}_m.$$

For antenna selection, any suitable decision metric is used to select the signal on the $k^{th}$ receive antenna for the $m^{th}$ subcarrier, and uses only that signal for computing the soft bits transmitted on the $m^{th}$ subcarrier, as indicated by signal path 118 in FIG. 1. Antenna selection metrics are known per se, and will therefore not be discussed in further detail for the sake of brevity only.

In accordance with a first embodiment, the preset combining weight/antenna selection stage 114 is arranged to perform a preset combining weight selection (PCW selection) for the various instances of the OFDM symbol of interest. To this end, the preset combining weight/antenna selection stage 114 comprises a data storage block, e.g. a ROM, RAM, flash memory, or any other suitable data storage medium, in which set of predefined combining weight vectors, i.e., $\{p_1; p_2; \ldots; p_K\}$ are stored. Similar to antenna selection, PCW selection is designed to choose the best combining weight vector and uses this vector to combine the signals from multiple antennas. It will be appreciated that any suitable set of vectors may be predefined. In an embodiment, in order to keep the complexity of combining the signals low, the combining weights from which the set of vectors has been created is limited to {0, 1, −1, j, −j}, wherein j is the imaginary number corresponding to the square root of −1. This has the advantage that the signal combination in combination stage 116 can be realized by means of addition and/or subtraction only, thus limiting the complexity of this stage.

For a two receive antenna system such as the receiver shown in FIG. 1, preset combining weights may for instance be chosen from the set PCW as:

$$p \in PCW = \{[1,0],[0,1],[1,1],[1,-1],[1,j],[1,-j]\}, \quad (8)$$

It should be realized that antenna selection is a special kind of PCW selection where the PCW set has only M weight vectors as the row vectors of an M×M size identity matrix. Thus, in the following, the focus will be on the PCW selection process only.

When the preset combining weight vector p is used for the $m^{th}$ subcarrier, the combined signal can be represented simply as:

$$\tilde{y}_m = p y_m \approx (p c_m) s_m + \sum_{n=0}^{N-1} (p d_n) \Xi_{m,n} s_n + p \bar{\vartheta}_m, \quad (9)$$

Thus, the combining process converts multiple observations of the signal into a single observation $\tilde{y}_m$. The combining task relies on the selection of an appropriate decision metric for choosing the best preset weight vector. It will be evident that this exercise should attempt to maximize the magnitude of $|pc_m|$ whilst keeping $\{|pd_n|\}$ as low as possible.

A suitable metric for the preset vector selection is signal-to-interference-and-noise (SINR) optimization, which is one of the most popular metrics considered in the design of receiver structures. It is widely used in interference-limited systems such as MIMO and CDMA receivers. For OFDM receivers suffering from ICI, when a preset combining weight vector p is used, the SINR at the $m^{th}$ subcarrier can be expressed as:

$$SINR_m = \frac{|pc_m|^2}{\sum_{n=0}^{N-1} |pd_n|^2 |\Xi_{m,n}|^2 + |p|^2 \sigma_n^2} \quad (10)$$

Due to its practicality, the SINR metric can be chosen as a decision metric for antenna or preset combining weight selection.

Figure 2:
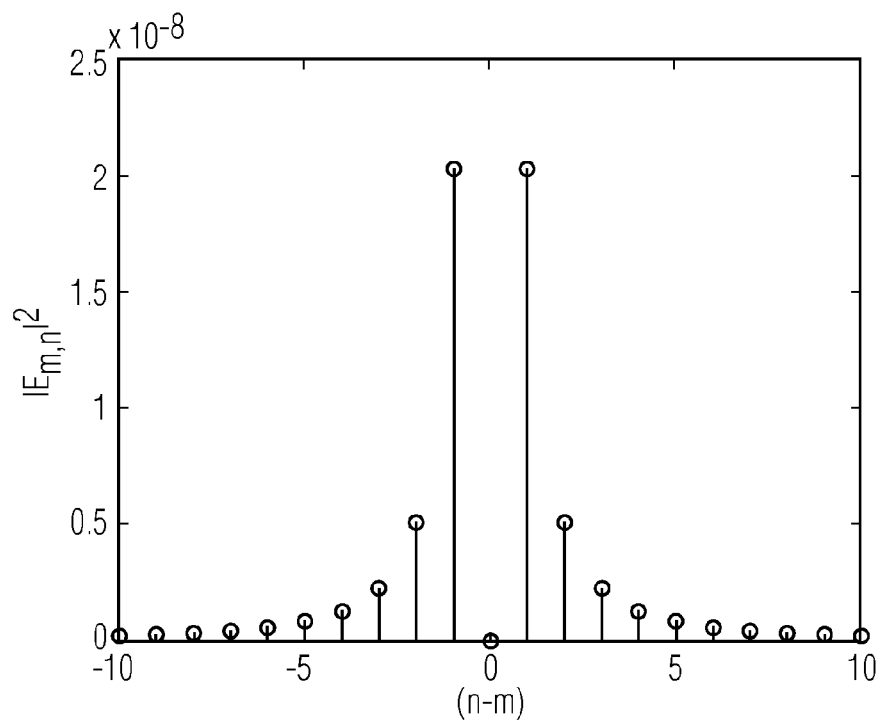
FIG. 2 depicts the ICI contribution to a subcarrier from its neighboring subcarriers.

For the exact computation of SINRm for each possible preset combining vector, the ICI contribution of all subcarriers to subcarrier m should be considered. However, such an approach significantly increases the computational complexity of selection process. However, for any subcarrier, the majority of its amount of ICI is caused by interference with its closest neighbouring subcarriers. The effect of each subcarrier to the other subcarriers can be assessed by the terms $\Xi_{m,n}$ in equation (4), where these terms only depend on the frequency spacing between the subcarriers, i.e., (n−m). This is demonstrated in FIG. 2, which depicts the ICI contribution of neighbouring subcarriers to the $m^{th}$ subcarrier by plotting $|\Xi_{m,n}|^2$ versus (n−m). As can be seen from FIG. 2, the closest two subcarriers amount to around 60.83% of the total ICI contribution in terms of power whereas the closest four subcarriers amount to around 76.03%.

Another significant factor increasing the complexity of the signal combination is that for each neighbouring subcarrier, different spatial signatures, i.e., $\{d_m\}$, are required to be weighted by $\Xi_{m,n}$. Due to the fact that the closest neighbouring subcarriers are generating the majority of the ICI, and the channel and its derivatives change very slowly over the frequencies of these subcarriers, a valid approximation is to assume that the ICI generating subcarriers have the same spatial signature as the ICI contribution of subcarrier m itself, such that for the computation of $SINR_m$, $H'_{i,n} \approx H'_{i,m}$, which yields $d_n \approx d_m$. This simple approximation leads to the simple approximation of $SINR_m$ as:

$$SINR_m \approx SINR_m^* = \frac{|pc_m|^2}{|pd_m|^2 \alpha + |p|^2 \sigma_n^2} \quad (11)$$

where the term is $\alpha = \sum_{n=0}^{N-1} |\Xi_{m,n}|^2$ constant, e.g., around $6.7 \times 10^{-8}$ for a 1116 Hz subcarrier spacing in a 8K OFDM mode of DVB-T. Thus, with this approximation, a significant number of multiplications and additions can be avoided for approximating the $SINR_m$ when p is used as the combining weight vector. Hence, this approximation greatly reduces the complexity of the preset combining weight/antenna selection stage 114.

An alternative metric that may be considered for designing receivers is minimum Euclidian distance. Minimum Euclidian distance determines the BER for the worst case scenario. For computing the minimum Euclidian distance, the same approach as used for the approximation of $SINR_m$, i.e. $d_n \approx d_m$ may be used. Thus, the received signal at the $m^{th}$ subcarrier after antenna selection or PCW combining can be further approximated as:

$$\tilde{y}_m \approx (pc_m) s_m + (pd_m) \left[ \sum_{n=0}^{N-1} \Xi_{m,n} s_n \right] + p \bar{\vartheta}_m. \quad (12)$$

If the ICI terms in equation (12) were all zero, then the minimum Euclidian distance would be $d_{min} = |pc_m| d_x$ where $d_x$ describes the minimum Euclidian distance of X-QAM (Quadrature Amplitude Modulation) modulation. A lower bound on the minimum normalized Euclidian distance can be devised as:

$$d_{min,m} \geq \frac{|pc_m| d_X - |pd_m| \cdot \max_{\{[s_0,\dots,s_{N-1}]\}} \sum_{n=0}^{N-1} |\Xi_{m,n} s_n|}{|p|} \quad (13)$$

which can be further approximated as:

$$d_{min,m}(p) \geq d_{lb,m}(p) = \frac{|pc_m| d_X - |pd_m| \beta}{|p|} \quad (14)$$

where $\beta = |s_{max}, XQAM| \sum_{n=0}^{N-1} |\Xi_{m,n}|$ with $|s_{max}, X-QAM|$ as the constellation point in X-QAM modulation with highest norm. Since $d_n \approx d_m$ holds for low $|n-m|$, i.e. for nearest neighbours such as the two or four nearest neighbours, $\beta = |s_{max}, XQAM| \sum_{n=m-i}^{N+i} |\Xi_{m,n}|$ with being the pairs of nearest neighbours included in the approximation, e.g. $\{i=1,2\}$, is used for the antenna or preset combining weight selection process.

At this point, it is observed that although the computation of $d_{lb,m}$ requires the computation of $|pc_m|$ and $|pd_m|$ for all possible {p}, the multiplication of preset combining vector p with $c_m$ or $d_m$ is a multiplication merely with $\{0, \pm 1; \pm j\}$ due to the limited set of weight factors selected for inclusion the preset combining vectors. Thus, this implementation does not include any real multiplications but simple additions or subtractions such that the complexity of the combining stage 116 is kept low, thus reducing the implementation cost of this stage. However, the computation of the norm of a complex number requires 2 real multiplications, 1 real addition and a square-root operation which may be quite costly for implementation.

As an alternative to a Euclidian distance metric, an absolute value distance metric such as disclosed by M. Ghosh et al. in the Proc. Of the IEEE Conference on Acoustics, Speech and Signal Processing 2005, Vol. 3 pages 1025-1028 may be used for the antenna or preset combining weight selection process. In this metric, the $d_{abs,m}$ decision criterion is used decision criteria for selection of preset combining weights:

$$\frac{|\text{Re}\{pc_m\}| + |\text{Im}\{pc_m\}| - \gamma(|\text{Re}\{pd_m\}| + |\text{Im}\{pd_m\}|)}{|p|} \quad (15)$$

where $\gamma \approx \beta/d_x$ is a constant, e.g., 0.0009 for 16 QAM modulation with $f_s$=1116 Hz. Since all 1/|p|'s are known, this approximation requires only 3 real multiplications and a few real additions/subtractions depending on p.

After the subcarrier combining stage 116, the receiver has single observation of the signal as $$y_{c,m} \approx H_{c,m} s_m + \sum_{n=0}^{N-1} H'_{c,n} \Xi_{m,n} s_n + \vartheta_{c,m}, \quad (16)$$

where $H_{c,m} = pc_m$ is the channel gain of subcarrier m, $H'_{c,n} = pd_n$ is the channel derivative of subcarrier n in the combined signal, and $v_{c,m}$ is the additive white Gaussian noise term. Both of $\{H_{c,m}\}$ and $\{H'_{c,n}\}$ are provided to soft bit computation stage 120 via 118. Transmitted symbol $s_m$ can be estimated by simply diving the combined signal by the combined channel gain, e.g., $S_{m,estimated} = y_{c,m}/H_{c,m}$. The log-likelihood-ratio (LLR) of the transmitted bits in $s_m$ can be further estimated considering the sum of both additive white Gaussian noise power and the ICI power in the combined signal as $$\sigma^2_{noise+ICI,m} = \quad (17)$$

$$\frac{\sigma^2_{noise} + \sum_n \left|\Xi\right|^2_{m,n} \left|H'_{c,n}\right|^2}{|H_{c,m}|^2} \approx \frac{\sigma^2_{noise} + \left|H'_{c,n}\right|^2 \sum_n |\Xi|^2_{m,n}}{|H_{c,m}|^2}$$

The soft bit computation stage may further comprise an ICI subtraction stage first before the LLR computation as disclosed by S. A. Husen et al. in 25th Symposium on Information Theory in the Benelux, 2004 (see e.g. http://www.win.tue.nl/wic2004/30.pdf). In such a case, the estimated symbol takes the form of $s_{m,estimated} = (y_{c,m} - y_{c,m-1}/H_{c,m-1} H'_{c,m-1} \Xi_{m,m-1} - y_{c,m+1}/H_{c,m+1} H'_{c,m+1} \Xi_{m,m+1})/H_{c,m}$, and the remaining ICI plus noise power to compute the LLRs of the transmitted bits becomes $$\sigma^2_{noise+ICI,m} = \frac{\sigma^2_{noise} + \sum_{n \neq m+1, m-1} \left|\Xi\right|^2_{m,n} \left|H'_{c,n}\right|^2}{|H_{c,m}|^2} \approx \quad (18)$$

$$\frac{\sigma^2_{noise} + \left|H'_{c,n}\right|^2 \sum_{n \neq m+1, m-1} |\Xi|^2_{m,n}}{|H_{c,m}|^2}$$

Figure 3:
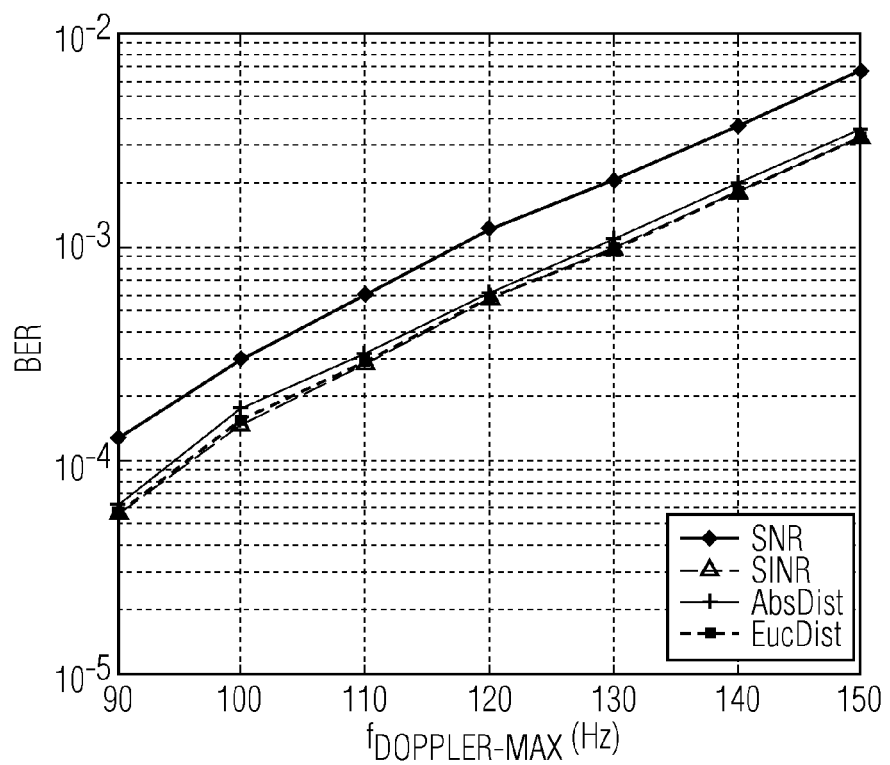
FIG. 3 depicts the BER versus maximum Doppler frequency performance in a near scatter environment for a receiver according to an embodiment of the present invention.
Figure 4:
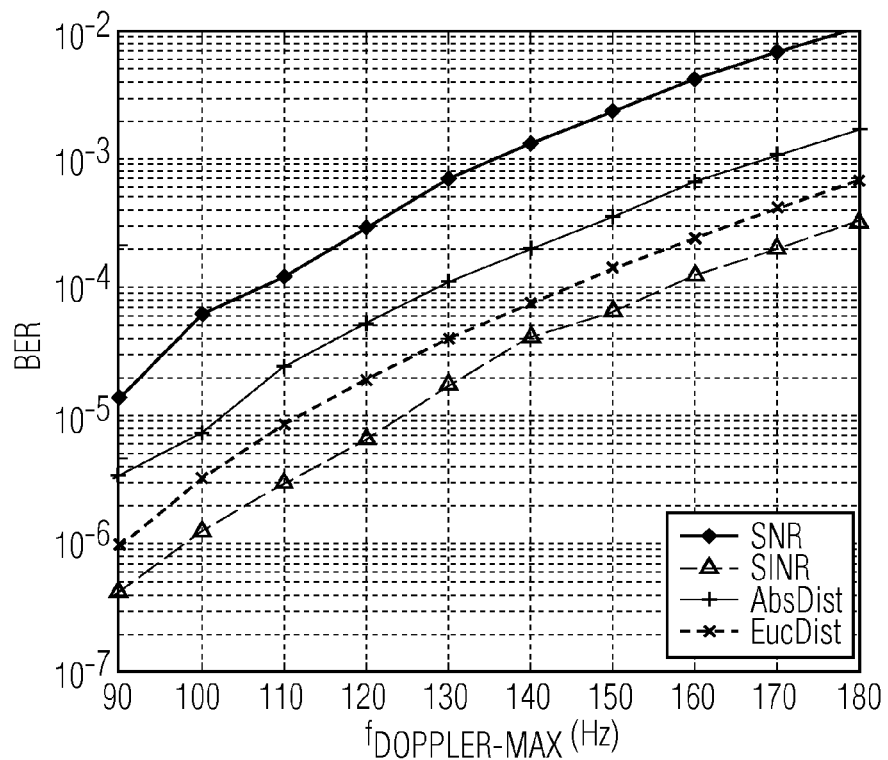
FIGS. 4 and 5 depict the BER versus maximum Doppler frequency performance for a receiver according to another embodiment of the present invention in a near scatter environment and a far scatter environment respectively.
Figure 5:
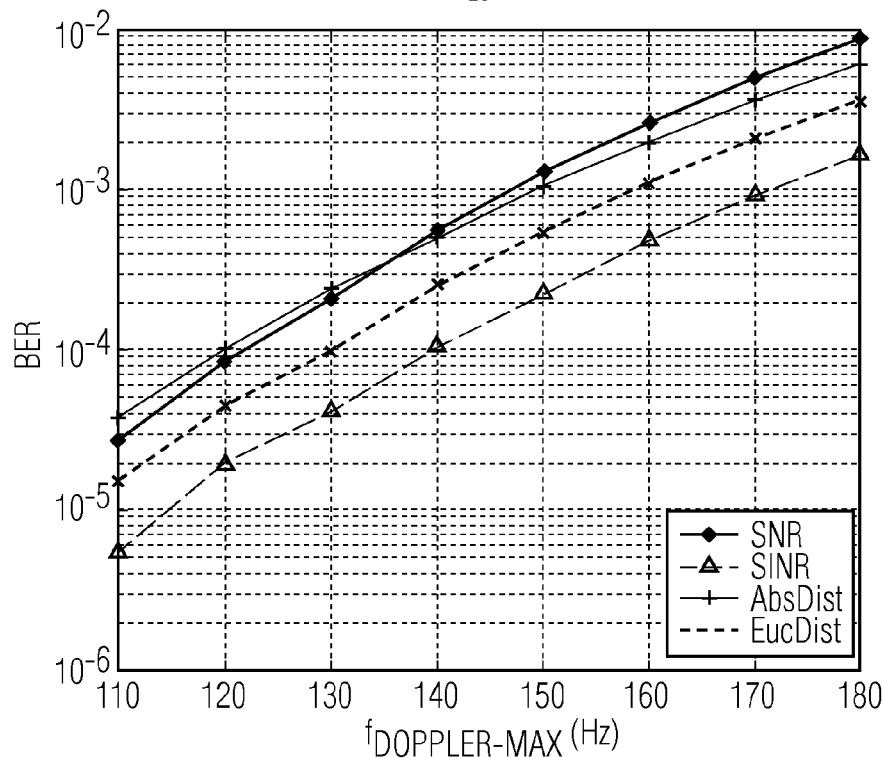

The effect of the weighted vector signal combination using the SINR metric of equation (11), the minimum Euclidian distance metric of equation (14) and the absolute value distance metric of equation (15) are demonstrated in FIGS. 4 and 5, which show the effect on the BER by the signal combination using these metrics in a near-scatter and far-scatter environments respectively. For comparison purposes, FIG. 3 shows the effect of these metrics on the BER when used for antenna selection only in a near-scatter environment.

These figures have been generated from numerical calculations to demonstrate the Doppler compensation performance of the proposed ICI aware antenna and PCW selection with these decision metrics. In these simulations, a DVB-T signal in 8K OFDM mode with a guard interval of ¼ and 1116 Hz of subcarrier spacing and a reception of 16 QAM modulation with a convolutional coding rate R=⅔ as specified in DVB-T standard was considered. The BER performance of antenna and PCW selection schemes at C/N=25 dB with various Doppler frequencies has been analyzed for a receiver having two receive antennas which observe two different TU-6 channels. The simulations have been based on the assumption that the channel estimation is done by simply windowing the OFDM signal, and that the FFT of only scattered pilots are taken to obtain the channel impulse response in time domain, and that the IFFT is taken of the portion of the estimated impulse response in the 1/12 of the samples to obtain the frequency response of the channel. The BER curves are obtained by simulating 1000 channel realizations with 4 OFDM symbols per channel realization.

FIGS. 3 and 4 show the maximum Doppler frequency vs. BER performance of ICI aware subcarrier based selection schemes in a near-scatter environment when using antenna selection and signal combination respectively where each multipath component is a summation of many scattered signal from different angle-of-arrivals. Thus, it is assumed that the two receive antennas observe independent and identically distributed TU-6 channels. In a near scatter environment, it is observed from FIG. 3 that all of ICI aware antenna selection schemes perform quite similar and outperform the conventional SNR based selection. For a target BER of $2\times10^{-4}$, the SNR based selection scheme provides a Doppler tolerance of around 95 Hz whereas others provide around 105 Hz.

As shown in FIG. 4, for PCW selection, it is observed that the SINR decision metric provides the best performance, followed by the Euclidian distance and the absolute value distance as expected. However, it is important to stipulate that all these PCW selection schemes outperform the SNR based selection PCM selection scheme, as well as all antenna selection schemes of FIG. 3. For a target BER of $2\times10^4$, the SNR based PCM selection scheme provides a Doppler tolerance of around 115 Hz whereas SINR, Euclidian distance and absolute value distance based PCW selection schemes provide around 170, 155 and 140 Hz of Doppler tolerance respectively, which is a dramatic improvement of the antenna selection based performance.

FIG. 5 shows the maximum Doppler frequency vs. BER performance of ICI aware PCW selection scheme in a far scatter environment where each multipath component is due to a single scattered signal from a certain angle-of-arrival. It is assumed that the antenna spacing is only 3λ where λ is the wavelength of the signal, and that there is no coupling between the antennas. Due to the poor scattering environment, the multipath components of the TU-6 channel that each antenna experiences are only phase-shifted versions of each other. Thus, the different TU-6 channels that the antennas experience are quite correlated. Due to high correlation in the time-varying channel, the diversity that ICI aware selection schemes can exploit is less than the near-scattering scenario.

Moreover, the spatial signatures the fixed and time-varying part of the channel form, i.e., $\{d_n\}$ and $\{c_n\}$, become correlated in far scattering environment. This has two different impacts on Doppler tolerance. Due to this correlation, the interference power and signal power are correlated leading to less wild SINR realizations, e.g., less deep fades in SINR per antenna, which leads better reception quality in mobile scenarios. However, at the same time, it is more difficult to avoid ICI by selection mechanisms only. Although not shown in a separate figure, it is reported that the various aforementioned decision metrics yield a similar Doppler tolerance in antenna selection schemes in far scattering environment. An improved performance is obtained by the PCW-based signal combination approach shown in FIG. 5. As can be seen in FIG. 5, the ICI aware PCW selection still outperforms SNR based PCW selection, but not as much as in the near-scattering environment.

Figure 6:
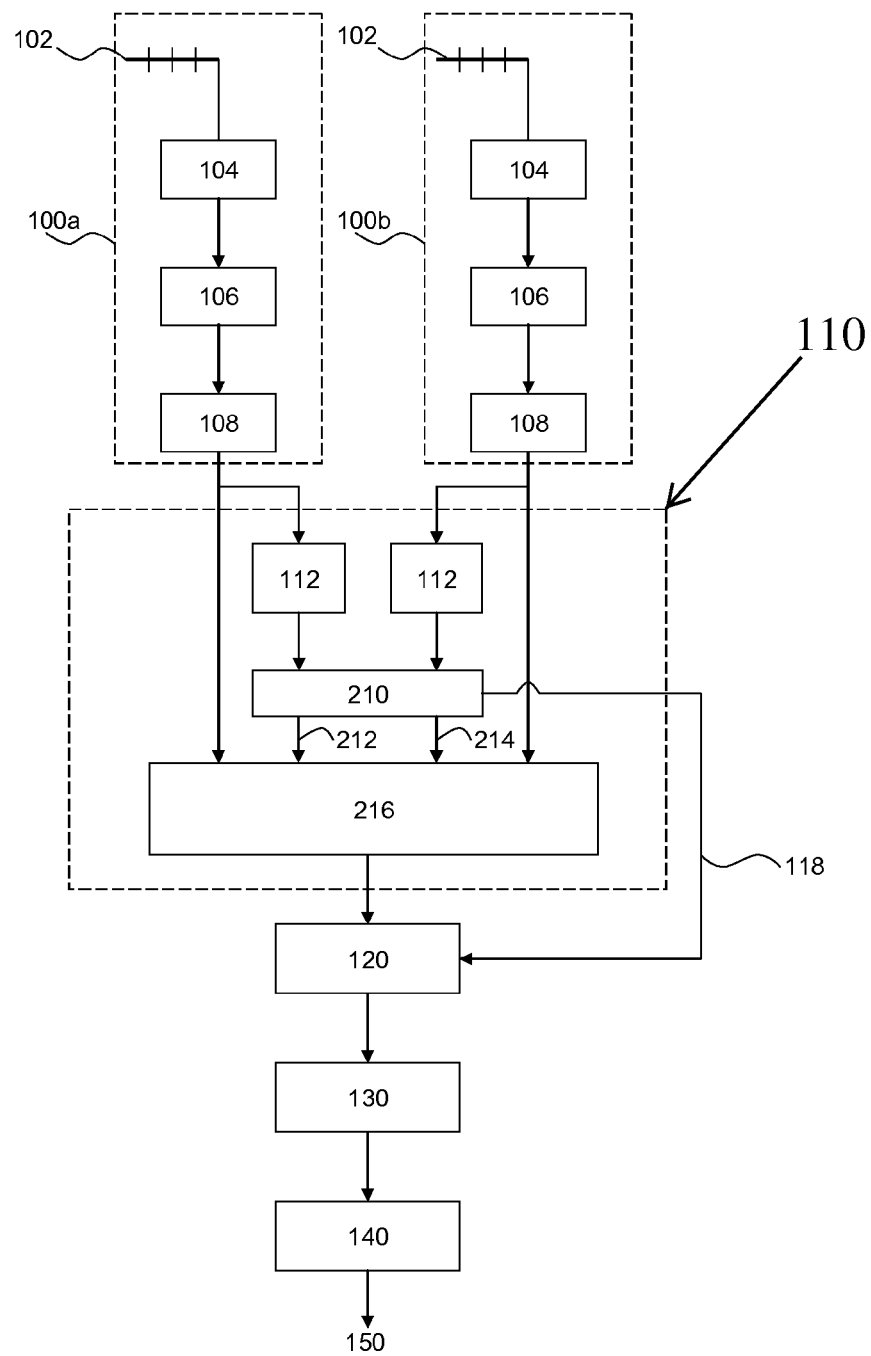
FIG. 6 depicts another example embodiment of the receiver of the present invention.

At this point, it is emphasized that the preset combining weight/antenna selection stage 114 of FIG. 1 is arranged to provide the subcarrier combining stage 116 with the combination instructions in the form of a selected preset weights vector, as discussed above. However, it should be appreciated that other implementations are also feasible. An alternative implementation of a receiver of the present invention is shown in FIG. 6, in which a combining weight computation stage 210 is arranged to provide the subcarrier combining stage 116 with individual weights for each subcarrier through signal paths 212 and 214.

In this embodiment, the combining weight computation stage 210 does not implement a selection metric for selecting the appropriate preset vector but calculates appropriate weight factors for each subcarrier from the channel frequency responses estimated by respective channel estimation stages 112. Examples of suitable metrics implemented by the combining weight computation stage 210 to calculate the subcarrier weight factors are given below. Following on from equations (1)-(7), the spatial signatures, i.e., $c_m$ and $\{d_n\}$, may be utilized in a minimum mean-squared error (MMSE) spatial combining scheme. Such schemes are known to provide the best linear combining scheme maximizing the SINR. Hence, the MMSE spatial combining scheme at the $m^{th}$ subcarrier, $g_m^{MMSE}$, can be found by solving the optimization problem:

$$g_m^{MMSE} = \underset{g_m}{\arg\min} E[|g_m^\dagger y_m - s_m|^2] \quad (19)$$

The optimization problem is similar to the known optimization problem of finding the MMSE detector for MIMO systems and synchronous CDMA systems. Following similar mathematical analysis as in H. Sampath et al., IEEE Transactions on Communications, 49, Vol. 12, 2001, pages 2198-2206, the MMSE receiver can be expressed as;

$$g_m^{MMSE} = \left( c_m c_m^\dagger + \sum_{n=0}^{N-1} |\Xi_{m,n}|^2 d_n d_n^\dagger + \sigma_n^2 I \right)^{-1} c_m. \quad (20)$$

Note that $g_m^{MMSE}$ maximizes the signal-to-interference ratio of the signal:

$$\left( SINR_m = \frac{|g_m^\dagger c_m|^2}{\sum_{n=0}^{N-1} |g_m^\dagger d_n|^2 |\Xi_{m,n}|^2 + |g_m^\dagger|^2 \sigma_n^2} \right) \quad (21)$$

which determines the performance. Even if $g_m^{MMSE}$ is unique, the $SINR_m$ maximizing combiner is not. Any scaled version of $g_m^{MMSE}$, i.e., $\{g_m^\clubsuit | g_m^\clubsuit = \alpha g_m^{MMSE} \text{ and } \alpha \neq 0\}$, also maximizes the $SINR_m$. A special scaled version of MMSE combiner may therefore be expressed as:

$$g_m^{SINR} = \left( \sum_{n=0}^{N-1} |\Xi_{m,n}|^2 d_n d_n^\dagger + \sigma_n^2 I \right)^{-1} c_m \quad (22)$$

which is a preferred embodiment of this combiner due to its simpler implementation in terms of hardware. The calculation of $g_m^{SINR}$ requires basically six steps:

1: Computation of the intercarrier interference covariance matrix $$E_m = (\Sigma_{n=0}^{N-1} |\Xi_{m,n}|^2 d_n d_n^\dagger + \sigma_n^2 I);$$

2: Inverting the matrix of size M×M, i.e., $E_m^{-1}$;
3: Multiplication of the M×M size matrix $E_m^{-1}$ with M×1-size vector $c_m$,
4: Normalization of the combining weights, i.e., $|g_m|^2=1$, for maintaining the noise power fixed over the subcarriers;
5: Combining the received signals with the computed combiner weights; and
6: Computing the channel gain of the combined signal.

For the computation of the exact $E_m$, the ICI contribution of all subcarriers to subcarrier m should be considered, which increases the computational complexity of $E_m$ significantly. However, as already has been discussed in the context of FIG. 2, a major amount of ICI experienced by a subcarrier is generated by interference with the nearest neighbouring subcarriers. Consequently, when applying the previously discussed approximation $d_n \approx d_m$, $E_m$ may be approximated by:

$$E_m \approx d_m d_m^\dagger \alpha + \sigma_n^2 I. \quad (23)$$

where the term $\alpha = \Sigma_{n=0}^{N-1} |\Xi_{m,n}|^2$ is a constant, e.g., around $6.7 \times 10^{-8}$ for a 1116 Hz subcarrier spacing in a 8K OFDM mode of DVB-T, as previously discussed. This approximation of $E_m$ also simplifies the matrix inversion step. By using the matrix inversion property of $$(X + aa^\dagger)^{-1} = X^{-1} - \frac{X^{-1} aa^\dagger X^{-1}}{1 + a^\dagger X^{-1} a}$$

for a positive semidefinite matrix X, $E_m^{-1}$ can be expressed as:

$$E_m^{-1} \approx \frac{1}{\sigma_n^2}\left(I - \frac{\alpha}{\sigma_n^2 + \alpha |d_m|^2} d_m d_m^\dagger\right). \quad (24)$$

Since any scaled version of $g_m^{SINR}$ also maximizes $SINR_m$, the first term $1/\sigma_n^2$ in the right of the approximation can be neglected, thus arriving at the following simple Doppler compensating combiner (SDCC):

$$g_m^{SDCC} = c_m - \frac{\alpha(d_m^\dagger c_m)}{\sigma_n^2 + \alpha |d_m|^2} d_m. \quad (25)$$

It should be observed that when the channel is static during one OFDM symbol, $d_m=0$, and the proposed combiner reduces to the simple maximum ratio combiner, i.e. $g_m^{SDCC}=C_m$. In another extreme case where the ICI is much larger than the noise, i.e., $\sigma_n^2 \ll \alpha |d_m|^2$, the proposed combiner reduces to a conventional zero-forcing solution, i.e., $g_m^{SDCC}=(I-(d_m d^\dagger_m/|d_m|^2))c_m$ where the ICI is suppressed completely. The $g_m^{SDCC}$ terms are typically computed in combining weight computation stage 210, which is arranged to receive the channel gains, H, and the channel derivatives from channel estimation stage 112.

FIGS. 7 and 8 depict the impact of the MMSE and SDCC subcarrier combining schemes on the BER as a function of the maximum Doppler frequency in a near-scatter environment and a far-scatter environment respectively. In these figures, the performance of the MMSE and SDCC subcarrier combining schemes is compared against the performance of a maximum ratio combining scheme. The same simulation setup as previously discussed was used for these simulations. The ten nearest neighbor subcarriers were included in the MMSE combining scheme. The channel estimates were assumed perfect for the MMSE computation such that estimation errors were not considered in the calculation of the MMSE combiner.

In the near-scatter environment, we observe that both of SDCC and MMSE combiners outperform MRC as expected. SDCC and MMSE perform quite similar to each other. Note that since the channel estimates are not perfect and we utilize an approximation for the time-varying channel, the MMSE combiners may not perform better than SDCC. In high mobility cases, we observe that the difference between the performance of MRC and SDCC or MMSE combiners becomes lower. This is due to two factors: the pilots experience ICI more severely in high mobility cases and the channel estimates, thus, channel derivatives become less accurate, and degrading the performance of MMSE/SDCC combiners due to less accurate computation of SINR maximizing combiners. Secondly, the first order Taylor series approximation of the time varying channel does not provide good modelling of the channel in very high mobility cases. However, in a wide range of maximum Doppler frequencies, the SDCC and MMSE combiners provide significant performance improvements with respect to MRC.

At this point, it is noted that the performance of the MMSE and SDCC combining schemes may be further improved by an additional log-likelihood ratio (LLR) computation step considering the ICI levels at each subcarrier following the combining step, by an additional 3-tap ICI cancellation scheme as disclosed by S. A. Husen et al. in 25th Symposium on Information Theory in the Benelux, 2004 (see e.g. http://www.win.tue.nl/wic2004/30.pdf), or by a combination of these techniques. The performance of these different options in a near-scatter environment is summarized in Table I, which shows the maximum Doppler frequencies that MRC and SDCC/MMSE can tolerate with quasi-error free (QEF) performance. It is reiterated that in DVB-T systems, QEF performance is defined as a BER of $2\times10^{-4}$ or less.

TABLE I

| Combiner Type | Combiner Only | Combiner + LLR | Combiner + 3-TAP ICI cancellation | Combiner + LLR + 3-TAP ICI cancellation |
|---|---|---|---|---|
| MRC | 122 | 136 | 140 | 170 |
| SDCC/MMSE | 246 | 260 | 254 | 262 |

It is evident that SDCC and MMSE combiner schemes can significantly enhance the Doppler tolerance of the system when compared to conventional MRC combining.

For a two-antenna receiver, the SDCC combiner scheme may be further approximated. In a two-antenna system, $g_m^{SDCC}$ may be expressed as:

$$g_m^{SDCC} = \begin{bmatrix} K+|H'_{m,2}|^2 & -H'_{m,1}H'^*_{m,2} \\ -H'^*_{m,1}H'_{m,2} & K+|H'_{m,1}|^2 \end{bmatrix} \begin{bmatrix} H_{m,1} \\ H_{m,2} \end{bmatrix} \quad (26)$$

wherein:

$$K = \frac{\sigma_n^2}{\sum_{n=0}^{N-1} |\Xi_{m,n}|^2}.$$

Normalization of this expression is simply achieved by:

$$g_m^{N-SDCC} = \frac{g_m^{SDCC}}{\sqrt{g_m^{SDCC\dagger} g_m^{SDCC}}} \quad (27)$$

where $(.)^\dagger$ denotes the Hermitian operator on the vector/matrix. The thus normalized combined weights are combined as:

$$y_{c,m} \approx g_m^{N-SDCC\dagger} \begin{bmatrix} y_{m,1} \\ y_{m,2} \end{bmatrix} \quad (28)$$

after which the channel gains and channel derivates in the combined may also be computed using ICI subtraction and soft-bit (LLR) computation steps:

$$H_{c,m} \approx g_m^{N-SDCC\dagger} \begin{bmatrix} H_{m,1} \\ H_{m,2} \end{bmatrix} \quad (29)$$

$$H'_{c,m} \approx g_m^{N-SDCC\dagger} \begin{bmatrix} H'_{m,1} \\ H'_{m,2} \end{bmatrix} \quad (30)$$

The complexity of the SDCC combining step may be reduces as follows. It has been recognized that the second step of the SDCC scheme, in which the combining weights are normalized, i.e. equation (24), requires a square root operation and a divisional operation, both of which are costly in terms of required number of processing cycles in a fixed point implementation.

This cost may be reduced by a first approximation:

$$\sqrt{g_m^{SDCC\dagger} g_m^{SDCC}} \approx |\Re\{g_{m,1}^{SDCC}\}| + |\Im\{g_{m,1}^{SDCC}\}| + |\Re\{g_{m,2}^{SDCC}\}| + |\Im\{g_{m,2}^{SDCC}\}|  \quad (31)$$

which removes the square root operation and four multiplication operation. R and I are the real and imaginary parts of these terms, respectively. The division operation may be removed based on the observation that the new simplified SDCC combiner may be expressed as:

$$g_m^{N-SDCC} = \frac{g_m^{SDCC}}{|\Re\{g_{m,1}^{SDCC}\}| + |\Im\{g_{m,1}^{SDCC}\}| + |\Re\{g_{m,2}^{SDCC}\}| + |\Im\{g_{m,2}^{SDCC}\}| +} \quad (32)$$

The denominator may be approximated by a second approximation:

$$|\Re\{g_{m,1}^{SDCC}\}| + |\Im\{g_{m,1}^{SDCC}\}| + |\Re\{g_{m,2}^{SDCC}\}| + |\Im\{g_{m,2}^{SDCC}\}| \approx 2^n \quad (33)$$

with $1/x \approx 2^{-n}$. Hence, $g_m^{N-SDCC}$ may be approximated by $g_m^{N-SDCC} \approx g_m^{SDCC} \times 2^{-n}$ thus obviating the need to perform a division operation in the SDCC combining process, which further reduces the computational complexity.

The same simulation set-up as previously discussed has been used to simulate the BER versus maximum Doppler frequency performance when using the non-approximated SDCC combiner, an SDCC combiner including the first approximation and an SDCC combiner using the first and second approximation in a near-scattering and far-scattering environment. The results are shown in FIGS. 9 and 10 respectively. It is demonstrated that the approximations only cause a modest degradation of the SDCC combiner performance. It is observed that the Doppler performances of each version of SDCC are quite close for both channel models. The degradation is limited to only around 3-10 Hz at a BER target of $2 \times 10^{-4}$ in the near-scatter channel model and to 7-9 Hz degradation at the same BER target for the far-scatter channel model.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An apparatus for processing a plurality of Fourier-transformed instances of a symbol, each instance being comprised in one of a plurality of frequency-divided multiplexed subcarriers, said apparatus comprising:
   a first circuit configured to estimate, for each instance, an instantaneous channel gain and an instantaneous inter-carrier interference contribution to said symbol from other subcarriers using channel change information during said symbol; and
   a second circuit configured to combine the instances into a single representation of said symbol based on the estimated channel gain and inter-carrier interference contributions.

2. The apparatus of claim 1, wherein the apparatus is arranged to estimate said instantaneous inter-carrier interference contributions of each subcarrier by expressing each of the respective channel change over time as a truncated Taylor series expansion including at least one time-variable term related to the inter-carrier interference contribution.

3. The apparatus of claim 1, wherein said instances are instances of the same subcarrier received by different receive antennas.

4. The processor of claim 1, wherein the combination of the instances is based on the estimated inter-carrier interference contributions of the subcarrier from its nearest neighbor subcarriers only.

5. The apparatus of claim 1, further comprising a data storage portion comprising a set of predefined vectors having a number of fields corresponding to a number of different instances of the symbol, each field containing a weight factor, wherein the apparatus is arranged to:
   generate a plurality of channel response products by multiplying the channel responses of the subcarriers in the respective instances relating to the same symbol with the corresponding weight factor from a predefined vector selected from said set; and to combine the channel response products, said predefined vector being selected such that the inter-carrier interference contribution to the combined channel response products is reduced.

6. The apparatus of claim 5, wherein the apparatus is arranged to select the predefined vector from said set for which the combined channel response products have an improved signal-to-interference-and-noise ratio.

7. The apparatus of claim 5, wherein the apparatus is arranged to select the predefined vector from said set for which the combined channel response products lead to an improved minimum Euclidian distance in the combined signal.

8. The apparatus of claim 5, wherein the apparatus is arranged to select the predefined vector from said set for which the combined channel response products lead to an improved minimum absolute distance in the combined signal.

9. The apparatus of claim 1, wherein the apparatus is arranged to combine the subcarriers relating to said symbol in the respective instances of said symbol using a minimum mean-squared error metric to obtain an improved signal-to-interference-and-noise ratio for said symbol.

10. The apparatus of claim 1, wherein the apparatus is arranged to combine the subcarriers relating to said symbol in the respective instances of said symbol using a metric to obtain an improved signal-to-interference-and-noise ratio for said symbol.

11. A receiver comprising:
   a fast Fourier transformation stage for transforming a plurality of frequency-divided multiplexed subcarriers, each subcarrier comprising a first symbol, wherein at least two subcarriers comprise different instances of the same first symbol;
   the apparatus of claim 1 coupled to the fast Fourier transformation stage;
   and a post-processing stage coupled to the processor apparatus for decoding the combined signals.

12. The receiver of claim 11, further comprising a plurality of antennas coupled to the fast Fourier transformation stage, each antenna being arranged to receive an instance of the plurality of frequency-divided multiplexed subcarriers, wherein the different instances of the same first symbol are obtained from different instances of the plurality of frequency-divided multiplexed subcarriers as received by different antennas.

13. The receiver of claim 12, further comprising an antenna selection stage for selecting one of said antennas, wherein the post-processing stage comprises a soft bit computation stage arranged to calculate soft bits for a subcarrier received by the selected antenna.

14. A method of processing a plurality of Fourier-transformed signals using a processor, each signal comprising a plurality of frequency-divided multiplexed subcarriers, each subcarrier comprising a symbol, wherein at least two subcarriers comprise different instances of the same symbol, said method comprising:
  estimating, for each instance, an instantaneous channel gain and an instantaneous inter-carrier interference contribution to said symbol received in a subcarrier from neighboring subcarriers using channel change information during said symbol; and
  combining subcarriers relating to the same symbol in respective antenna signals based on the estimated channel gain and inter-channel interference contributions.

15. The method of claim 14, further comprising:
  providing a set of predefined vectors having a number of fields corresponding to a number of antenna signals, each field containing a weight factor;
  generating a plurality of channel response products by multiplying the channel responses of the subcarriers relating to the same symbol with the corresponding weight factor from a predefined vector selected from said set; and
  combining the channel response products, said predefined vector being selected such that the inter-carrier interference contribution to the combined channel response products is reduced.

16. An apparatus for processing a plurality of OFDM (Orthogonal Frequency Division Multiplexing) modulated symbols, each data symbol being comprised in one of a plurality of frequency-divided multiplexed subcarriers, said apparatus comprising:
  a first circuit configured to estimate, for each subcarrier of each OFDM symbol, an instantaneous, subcarrier specific channel gain and an instantaneous, subcarrier specific inter-carrier interference contribution to said subcarrier from other subcarriers at said OFDM symbol using channel change information of each subcarrier during said OFDM symbol; and
  a second circuit configured to combine the subcarriers into a single representation of said data symbol based on the estimated channel gains of the subcarriers at said OFDM symbols and inter-carrier interference contributions of the subcarriers at said OFDM symbols.

17. The apparatus of claim 16, wherein the apparatus is arranged to estimate said instantaneous and subcarrier specific inter-carrier interference contributions by expressing each of the respective instantaneous channel changes of each subcarrier during said OFDM symbol as a truncated Taylor series expansion including at least one time-variable term related to the inter-carrier interference contribution.

18. The apparatus of claim 16, further comprising a data storage portion comprising a set of predefined vectors having a number of fields corresponding to the number of different instances of a symbol, each field containing a weight factor, wherein the apparatus is arranged to:
  generate a plurality of channel response products by multiplying the channel responses of the subcarriers in the respective instances relating to the same symbol with the corresponding weight factor from a predefined vector selected from said set; and
  to combine the channel response products, said predefined vector being selected such that the inter-carrier interference contribution to the combined channel response products is reduced.

* * * * *